United States Patent
Clott

(10) Patent No.: US 10,382,831 B2
(45) Date of Patent: Aug. 13, 2019

(54) DETERMINING SIGNAL RECOVERY IN COMMUNICATION NETWORKS USING CONNECTIVITY DISRUPTION TECHNIQUES

(71) Applicant: Cox Communications, Inc., Atlanta, GA (US)

(72) Inventor: Michael Clott, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 42 days.

(21) Appl. No.: 15/465,001

(22) Filed: Mar. 21, 2017

(65) Prior Publication Data
US 2018/0278465 A1 Sep. 27, 2018

(51) Int. Cl.
*H04N 21/61* (2011.01)

(52) U.S. Cl.
CPC ..... *H04N 21/6168* (2013.01); *H04N 21/6118* (2013.01)

(58) Field of Classification Search
CPC ............ H04L 41/0654; H04N 21/6118; H04N 21/6168
See application file for complete search history.

(56) References Cited

U.S. PATENT DOCUMENTS

| | | | | | |
|---|---|---|---|---|---|
| 4,829,284 | A | * | 5/1989 | Pfaff | G01R 31/11 324/66 |
| 5,801,985 | A | * | 9/1998 | Roohparvar | G11C 5/04 365/185.01 |
| 5,818,385 | A | * | 10/1998 | Bartholomew | H01Q 1/246 342/372 |
| 9,136,937 | B1 | * | 9/2015 | Cheng | H04B 7/0811 |
| 9,356,796 | B2 | * | 5/2016 | Shapson | H04L 12/2838 |
| 9,729,937 | B2 | * | 8/2017 | Thompson | H04N 21/6168 |
| 2009/0232226 | A1 | * | 9/2009 | Knutson | H04N 7/17309 375/240.29 |

* cited by examiner

*Primary Examiner* — Asad M Nawaz
*Assistant Examiner* — Thomas R Cairns
(74) *Attorney, Agent, or Firm* — Eversheds Sutherland (US) LLP

(57) ABSTRACT

Various embodiments relate to disrupting signals (e.g., over Multimedia over Coax or from a service provider) to determine signal recovery. A first device may receive signals from a network. The first device may receive a first input to switch the received signals from a first communication path between the network and a second device, to a second communication path for a predetermined interval. The switching of communication paths may be done by a network disruption device. When the signals are switched to the second communication path, the signals may be blocked from being received at the second device. The network disruption device may then switch the signals from the first communication path to the second communication path to block the signals for the predetermined interval. The network disruption device may then switch the signals from the second communication path to the first communication path after the predetermined interval has expired.

18 Claims, 4 Drawing Sheets

DETERMINING SIGNAL RECOVERY IN COMMUNICATION NETWORKS USING CONNECTIVITY DISRUPTION TECHNIQUES

BACKGROUND

Home communication networks, such as Multimedia over Coax Alliance (MoCA) networks, may be hindered by momentary (i.e., millisecond) changes in coaxial network impedance resulting in a loss of connectivity with user devices configured to present received content. Existing MoCA techniques configured to adapt to changes in coaxial network impedance include signal recovery times on the order of minutes thereby increasing the possibility of a network failure.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Figure 1:
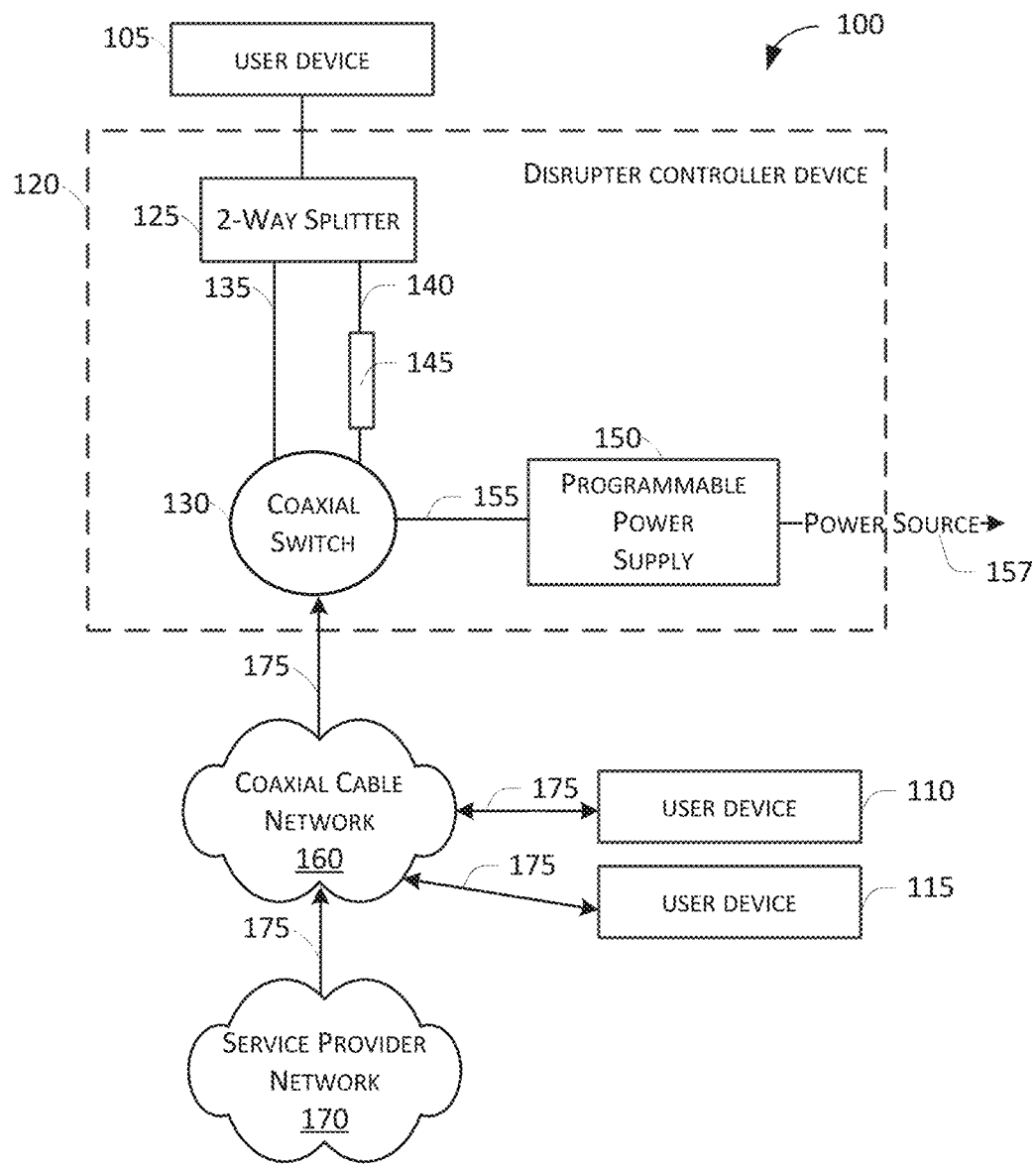
FIG. 1 illustrates an example network environment in which a disrupter controller device may be utilized, according to an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein relate to, among other things, disrupting signals sent over a Multimedia over Coax Alliance (MoCA). In certain embodiments, a disrupter controller device (e.g., a network disruption device) may be installed between a user device and a coaxial cable network at a customer premises or in simulated home networks located in laboratories. The disrupter controller device may be utilized to test the capability of the user device to recover from signal disruptions in a MoCA network. The MoCA network may include multiple user devices and the coaxial cable network. Each of the user devices may comprise one or more cable set-top boxes for playing media received in signals from another user device. The user devices in the MoCA network may comprise a multi-DVR or "Whole-home" DVR system where each of the user devices are networked together and are each capable of streaming media signals to and from each other. In one embodiment, the disrupter controller device may be configured to cause a signal disruption in the MoCA network by preventing media signals from being received by one of the user devices for a predetermined time interval. In particular, the disrupter controller device may be configured to switch media signals from a first or "through-path" over which the media signals may be received by a user device to a second or blocked path over which the media signals are blocked, and therefore, prevented from being received by the user device.

After the MoCA network has been disrupted, a time interval may be measured for the affected user device to resume receiving media signals and thereby determine the ability of the MoCA network to recover. For example, in some embodiments, a desirable outcome for a robust or healthy MoCA network may be defined as the user device receiving the media signals during a time interval comprising 50 to 500 milliseconds after a signal disruption has occurred. A less desirable outcome may be defined as the user device receiving the media signals during a time interval comprising 500 milliseconds to 30 seconds after a signal disruption has occurred. Finally, an undesirable outcome may be defined as the user device resuming playing the video after a time interval comprising more than 30 seconds after a signal disruption has occurred. It should be understood that the embodiments described herein may simulate real world network impairments to validate that user devices are robustly designed.

FIG. 1 depicts an example network environment 100 in which a disrupter controller device 120 may be utilized, according to an embodiment of the disclosure. The network environment may include, but is not limited to, user devices 105, 110 and 115, the disrupter controller device 120, a coaxial cable network 160, and a service provider network 170. The service provider network 170 may include a headend and a hybrid-fiber coaxial network configured to send signals 175 (e.g., multimedia signals carrying data, such as broadband signals) to the coaxial cable network 170 which may be terminated at a customer premises along with the user devices 105-115 and the disrupter controller device 120.

The user devices 105-115, the disrupter controller device 120 and the coaxial cable network may be located at a customer premises, in certain embodiments. In addition to the aforementioned devices, the customer premises may further include various additional devices and components to facilitate receiving and converting signals for use by the user devices 105-115. Example devices may include, but are not limited to, a gateway, an optical network terminal (ONT), a media converter, etc. For example, a gateway device (not shown) may receive the signals 175, demodulate the signals 175 to obtain information (e.g., data) in the signals 175, and distribute the information to the user devices 105-115 at the customer premises over one or more networks, such as a Multimedia over Coax Alliance ("MoCA") network.

The signals 175 (e.g., broadband signals) sent from the service provider network 170 to the coaxial cable network 160 may be communicated according to various formats or standards such as, but not limited to, Data Over Cable Service Interface Specification (DOCSIS), by Quadrature Amplitude Modulation (QAM) (DOCSIS 1.0-3.1) or Orthogonal Frequency Division Multiplexing (OFDM) (DOCSIS 3.1), Passive Optical Network (PON), Ethernet Passive Optical Network (EPON), or other communication standards for wired or wireless communications supported by devices and components in the service provider network 170.

The user devices 105-110 at the customer premises may include one or more set-top boxes, digital video recorders (DVRs), televisions, cable modems, mobile devices, etc., or other devices that may facilitate receiving and presenting content received from the service provider network 170. As another example, the user devices 105, 110, 115 may comprise a multi-DVR or "Whole-home" DVR system where each of the user devices 105, 110, and 115 are networked together and are each capable of streaming media signals to and from each other.

The disrupter controller device 120 may receive the signals 175 from the coaxial cable network 160 at, for example, a customer premises. The disrupter controller device 120 may include a splitter 125, a coaxial switch 130 and a programmable power supply 150 which may be connected to a power source 155 (e.g., an alternating current (AC) power source). The coaxial switch 130 may be connected to the splitter 125 via coaxial cables 135 and 140, thereby creating a first path and a second path for passing the signals 175 to the user device 105. The coaxial cable 140 may include a filter 145. In some embodiments, the filter 145 may be a low pass filter such as, for example a 1000 MHz low pass filter (known as a point-of-entry (POE) filter capable of blocking MoCA signals.) In some embodiments, the filter 145 may be a band-stop filter for blocking a subset (e.g., one or more but not all) of the signals 175 over a communication path. For example, the band-stop filter may comprise a 6 MHz wide filter in the 102 to 1002 MHz band that will block a specific downstream channel rather than blocking the entire downstream spectrum. Another example would be a 6 MHz band stop filter in the 5 to 85 MHz band to block upstream signals In one embodiment, the coaxial switch 130 may function by momentarily switching the signals 175 from the first path (e.g., a through-path) to the second path (e.g., a filtered path). As will be discussed in greater detail below, when the coaxial switch 130 is switched to the first path, the signals 175 may pass through the coaxial cable 135 to the splitter 125 and then to the user device 105. When the coaxial switch is switched to the second path, one or more of the signals 175 may be blocked by the filter 145 from passing through the coaxial cable 140 to the user device 105, thereby disrupting communication from the coaxial cable and service provider networks 160 and 170, respectively.

In some embodiments, the coaxial switch 130 may be connected to the programmable power supply 150 via a control cable 155. As will be described in greater detail below with respect to FIGS. 2-4, the programmable power supply 150, in one embodiment, may provide to the coaxial switch 130 a control voltage pulse of a predetermined magnitude and duration, such as at 12 volts for 50 to 500 milliseconds. In certain embodiments, the programmable power supply 150 may provide multiple control voltage pulses in serial fashion with predetermined intervals between the pulses.

As described above, in various embodiments, the disrupter controller device 120 may be installed between the user device 105 and the coaxial cable network 160 and utilized to test the capability of the user device 105 to recover from signal disruptions in a MoCA network. In one embodiment, the MoCA network may comprise the user devices 105, 110, and 115 and the coaxial cable network 160. The user device 105 may comprise a cable set-top box for playing video received in a signal received from another user device (e.g., the user device 110 or the user device 115). The user devices 105, 110, 115 may comprise a multi-DVR or "Whole-home" DVR system where each of the user devices 105, 110, and 115 are networked together and are each capable of streaming media signals to and from each other. In one embodiment, the disrupter controller 120 may be configured to cause a signal disruption in the MoCA network by blocking the signals 175 sent to the user device 105 (e.g., from the user devices 105 or 110. After the MoCA network has been disrupted, a time interval may be measured for the set-top box undergoing testing (e.g., the user device 105) to resume playing a video signal and thereby determine the robustness of the MoCA network and the robustness of the settops to conceal faults with the underlying MoCA network. For example, in some embodiments, a desirable outcome may be defined as the set-top box resuming playing a video over the MoCA network during a time interval comprising 50 to 500 milliseconds. A less desirable outcome may be defined as the set-top box resuming playing the video over the MoCA network during a time interval comprising 500 milliseconds to 30 seconds. Finally, an undesirable outcome may be defined as the set-top box resuming playing the video after a time interval comprising more than 30 seconds.

In another embodiment, the disrupter controller device 120 may be configured to cause a signal disruption by blocking the signals 175 sent to the user device 105 from the service provider network 170. For example, the filter 145 may be configured (or replaced with a suitable configured component) to block signals sent from the service provider network 170 having frequencies in the range of 102 to 1002 MHz. It should be appreciated that by blocking signals from the service provider network 170, the robustness of the user device 105 may be tested. For example, by blocking the downstream signals 175 from reaching the user device 105 for 50 or more milliseconds, the affected settop will determine there has been a disruption (e.g., if the OCAP tunnels, that is, the downstream control channels, have been blocked for several minutes). The time it takes for the user device to recover, for example, to start playing the video being received in the downstream signal 175, is indicative of the robustness of the software stack at the user device 105 to minimize downstream network disruptions. Another example would be if the filter 145 may be replaced with a filter in the 5 to 85 MHz band to block one or more of the signals from the settops (105, 110 and 115) to the service provider network The above descriptions in FIG. 1 are for purposes of illustration and are not meant to be limiting. Other descriptions, examples, embodiments, etc., may also exist. Also, although a certain number of devices or components are shown, fewer or more of each of these devices or components may exist in other embodiments.

Figure 2:
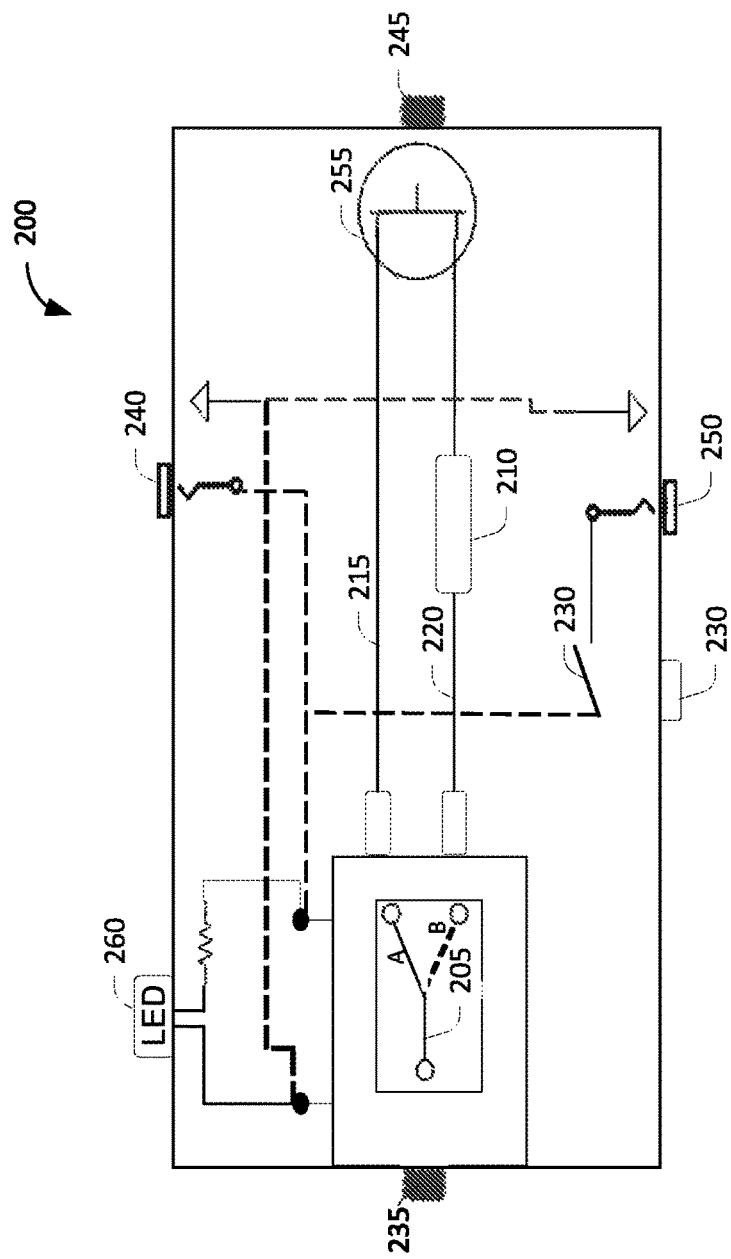
FIG. 2 illustrates an example coaxial switch and splitter device, according to an embodiment of the disclosure.

FIG. 2 illustrates an example of a combined coaxial switch and splitter device 200, according to an embodiment of the disclosure. In this embodiment, the disrupter controller device 120 (discussed above with respect to FIG. 1) may be implemented as a combined coaxial switch and splitter device and a separate controller device (e.g., a programmable power supply, as disclosed in connection with FIG. 3). The device 200 may include a coaxial switch 205, a filter 210, a first path 215, a second path 220, a momentary switch 230, coaxial connectors 235 and 245, 12-VDC power connectors 240 and 250, a splitter 255, and a light emitting diode (LED) 260.

With respect to the device 200, the coaxial switch 205 may comprise a coaxial switch similar to the coaxial switch 130 of FIG. 1. The switch 205 may have a first position (shown by the solid line A in FIG. 2.) and a second position (shown by the dashed line B in FIG. 2). The coaxial switch 205, when in the first position, may send media signals (e.g., MoCA signals) received from the coaxial connector 235 over the first path 215 to the coaxial connector 245. The coaxial switch 205, when in the second position, may send media signals received from the coaxial connector 235 over the second path 220 where one or more of the signals may be blocked by the filter 210 from reaching the coaxial connector 245. In one embodiment, the coaxial connector 235 may be a connection to a user device (e.g., a set top box) located at a customer premises and the coaxial connector 245 may be a connection to a coaxial cable and/or service provider network.

In one embodiment, the selection of the second position from the (default) first position by the coaxial switch 205 may be initiated by a user manually depressing the momentary switch 230 so as to apply a DC voltage supplied to the device 200 at the power connector 250. Upon the voltage being applied to the coaxial switch 205, the coaxial switch 205 may open the path 215 and close the path 220 so as to send the signals (downstream or upstream or MoCA) over the second path 220 where they will be at least partially blocked by the filter 210. In addition, in response to the coaxial switch 205 being switched from the first path 215 to the second path 220 the LED 260 may be switched from off to on so as to alert a user that one or more of the downstream or upstream or MoCA signals received from the coaxial connector 235 are being at least partially blocked by the filter 210.

Figure 3:
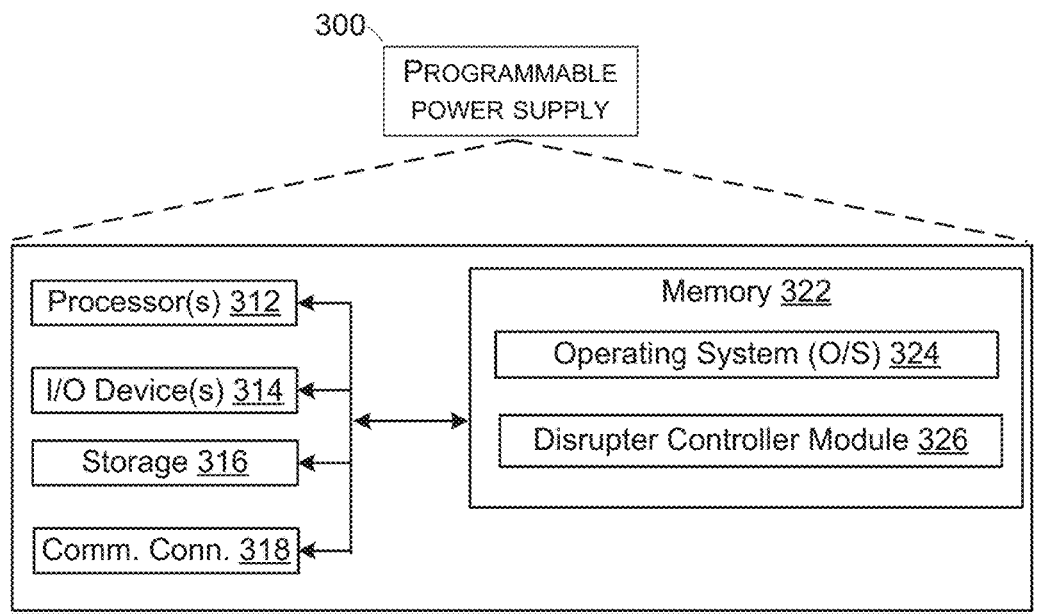
FIG. 3 illustrates components in a programmable power supply utilized in the disrupter controller device of FIG. 1, according to an embodiment of the disclosure.

In another embodiment, the selection of the second path 220 from the (default) first path 215 by the coaxial switch 205 may be initiated by a programmable power supply (such as the programmable power supply disclosed in connection with FIG. 3) in communication with the power connector 240. The programmable power supply may function as a controller that may be configured to provide one or more controlled voltage pulses of a predetermined magnitude and duration, such as 12 volts DC for 50 to 500 milliseconds, to the power connector 240. The programmable power supply may be actuated by a button or switch that may be manually actuated, or by another user input or interface means associated with the programmable power supply, for causing the programmable power supply to generate the control voltage pulse(s). In an embodiment, to test the robustness of settops, the programmable power supply may be configured to provide the control voltage pulse once for 50 milliseconds, or alternatively, can provide the control voltage pulse periodically, for example, every couple minutes, in a continuous fashion.

FIG. 3 illustrates components in a programmable power supply 300 that may be utilized as the power supply 150 in the disrupter controller device 120 of FIG. 1 or to provide the voltage control pulse to the power connector 240 in FIG. 2. In one embodiment, the programmable power supply 300 may include one or more processors configured to communicate with one or more memory devices and various other components or devices. In an example embodiment, the programmable power supply 300 may include one or more processors 312, and in some implementations, one or more input/output (I/O) devices 314, storage 316, and one or more communication connections 318.

The one or more processors 312 may be implemented as appropriate in hardware, software, firmware, or a combination thereof. The memory 322 may store program instructions that are loadable and executable on the processor 312, as well as data generated during the execution of these programs. Depending on the configuration and type of the programmable power supply 300, the memory 322 may be volatile, such as random access memory (RAM), static random access memory (SRAM), dynamic random access memory (DRAM); or non-volatile, such as read-only memory (ROM), Electrically Erasable Programmable Read-Only Memory (EEPROM), flash memory, etc.

The memory 322 and the storage 316, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The I/O devices 314 may enable a user to interact with the programmable power supply 300. The I/O devices 314 may include, but are not limited to, a keyboard, a mouse, a pen, a voice input device, a touch input device, a gesture detection or capture device, a display (e.g., an LCD display), a camera or an imaging device, speakers, and/or a printer. The I/O devices 314 may include a trigger button or switch that may be manually actuated to cause the programmable power supply 300 to generate the voltage control pulse(s) as discussed herein. Further, the I/O devices 314 may include a variable switch or potentiometer ("pot") may be used to set the length (e.g., duration) of the voltage control pulse. That is, adjusting the pot the user may set the duration of the voltage control pulse that maybe generated by the programmable power supply 300 upon the actuation of the trigger button of the programmable power supply 300. Further, the communication connections 318 may allow the programmable power supply 300 to communicate with other devices, such as the user devices 105-110.

Turning to the contents of the memory 322, the memory 322 may include, but is not limited to, an operating system (O/S) 324 and a disrupter controller module 326. The O/S 324 may be any suitable application, module, firmware, etc., that controls the general operation of the programmable power supply 300. The O/S 324 may also facilitate the execution of other software modules, for example, the disrupter controller module 326 shown in the memory 322, in one implementation.

In one embodiment, the disrupter controller module 326 may include executable instructions that may cause the programmable power supply 300 to output 12 V DC pulses to the coaxial switch 130 of FIG. 1, for example, for durations of at least 50 milliseconds. In another embodiment, the disrupter controller module 326 may include executable instructions that take the output of a potentiometer (not shown) of the programmable power supply 300 and determine therefrom the predetermined duration (e.g., in a range between 50 and 500 milliseconds) during which the voltage control pulse is sent to the power contact 240, thereby causing the coaxial switch 205 to direct the downstream or upstream or MoCA signal to the second path 220, where the signal may be blocked by the filter 210, and thus prevented from being received by the user device 105. The above descriptions accompanying FIG. 3 are for purposes of illustration and are not meant to be limiting.

In one embodiment, the programmable power supply 300 may be a California Instruments 751iX-LAN power supply manufactured by AMETEK CORPORATION of Berwyn, Pa. In yet another embodiment, the programmable power supply may comprise a programmable microcontroller device having a 12-volt relay (which may be embodied, for example, by a silicon chip (e.g., a Half-H controller)). For example, the programmable microcontroller device may comprise an ARDUINO single board microcontroller.

Figure 4:
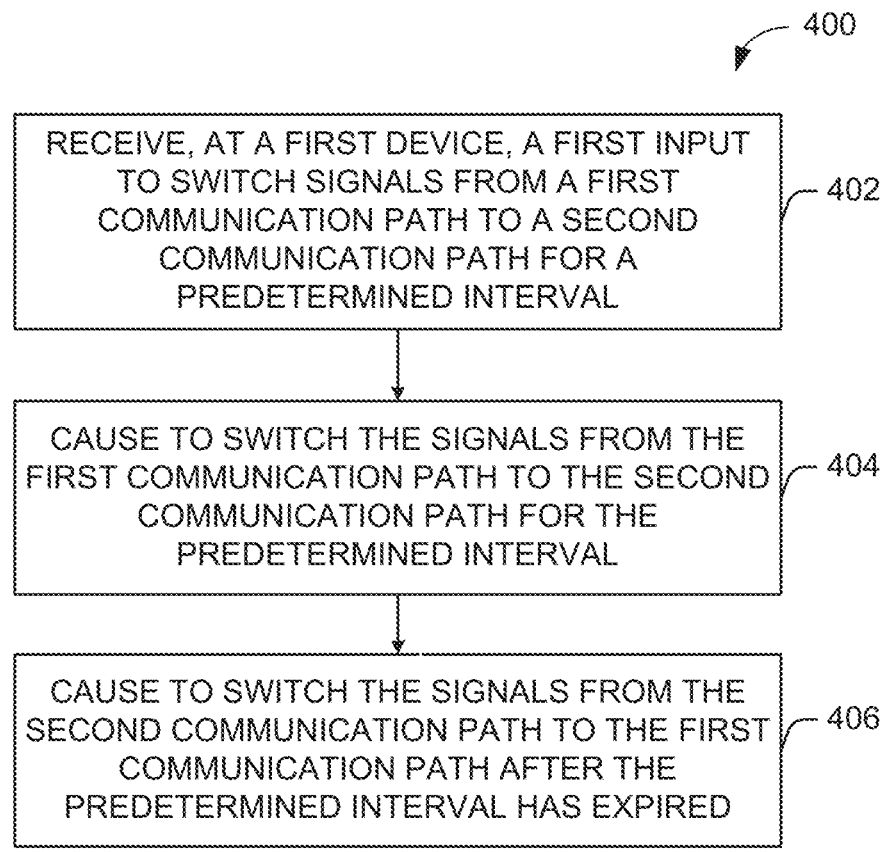
FIG. 4 illustrates a flow diagram of an example process for determining signal recovery using connectivity disruption techniques, according to an embodiment of the disclosure.

FIG. 4 illustrates a flow diagram of an example process 400 for determining signal recovery using connectivity disruption techniques, according to an embodiment of the disclosure. The example process 400 may be implemented at least in part by a first device such as the disrupter controller device 120 of FIG. 1. The example process 400 may begin at block 402, where the first device may receive a first input to switch signals from a first communication path to a second communication path for a predetermined time, that is, duration. In some embodiments, switching to the second communication path for the predetermined time then returning to the first communication path could be repeated programmatically by the programmable power supply, as discussed above, for many cycles. The signals received over the first communication path may be passed to a user device (e.g., the user device 105 of FIG. 1) for playback and the signals received over the second communication path may be blocked from being passed to the user device. The signals may be MoCA signals that include data (e.g., video data) received from a coaxial network in communication with the first device and the user device at a customer premises. In another embodiment, the signals may be signals received from a service provider network (e.g., the signals 175 from the service provider network 170 of FIG. 1). The first device may include a controller which may be a programmable power supply such as the programmable power supply 300 of FIG. 3.

At block 404, the first device may cause to switch the signals from the first communication path to the second communication path. In one embodiment, the first device may be configured to switch the signals from the first communication path to the second communication path by sending one or more direct current (DC) pulses for a predetermined number of milliseconds corresponding to the predetermined interval. The first device may further include a low-pass filter configured to block all of the signals over the second communication path or a band-stop filter to block a subset (e.g., one or more but not all) of the signals over the second communication path.

At block 406, the first device may cause to switch the signals from the second communication path to the first communication path after the predetermined interval has expired. It is understood that the above descriptions are for purposes of illustration and are not meant to be limiting.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Further, although specific terms are employed herein, they are used in a generic and descriptive sense only and not for purposes of limitation.

What is claimed is:

1. A device, comprising:
   a first coaxial connector;

a coaxial switch connected to the first coaxial connector, the coaxial switch having an input, and a first output and a second output that are selectively coupled to the input;

a first communication path coupled to the first output;

a second communication path coupled to the second output, the second communication path including a blocking filter configured to block at least a portion of a signal on the second communication path;

a splitter that connects the first communication path and the second communication path to a second coaxial connector;

a programmable power supply configured to generate periodic voltage control pulses for a duration between 50 milliseconds and 500 milliseconds, including a voltage control pulse; and a first power connector coupled to the coaxial switch and configured to receive the voltage control pulse from the programmable power supply and to provide the voltage control pulse to the coaxial switch for actuating the coaxial switch;

wherein the voltage control pulse causes the coaxial switch to connect the input to the second output for a first period of time.

2. The device of claim 1, wherein the voltage control pulse includes a magnitude of 12 volts direct current.

3. The device of claim 1, wherein the signal comprise one or more Multimedia over Coax Alliance (MoCA) signals.

4. The device of claim 3, wherein the blocking filter comprises a low-pass filter configured to block the MoCA signals.

5. The device of claim 1, wherein the blocking filter comprises a band-stop filter configured to block at least the portion of the signal.

6. The device of claim 1, further comprising a set-top box coupled to the first communication path.

7. The device of claim 1, further comprising a second power connecter coupled to the coaxial switch and configured to receive a second voltage control pulse and to provide the second voltage control pulse to the coaxial switch for actuating the coaxial switch in response to an actuation of a manual switch.

8. The device of claim 7, wherein the second voltage control pulse includes a duration associated with an amount of time the manual switch is actuated.

9. A method comprising:

receiving, at a first device comprising one or more processors, a first input comprising a first periodic voltage control pulse with a duration between 50 milliseconds and 500 milliseconds from a programmable power supply to switch broadband signals from a first communication path between a coaxial cable network and a second device to a second communication path, wherein the second communication path blocks the broadband signals from being received at the second device;

causing, in response to the first input, to switch the broadband signals from the first communication path to the second communication path for the duration; and causing to switch the broadband signals from the second communication path to the first communication path after the duration has expired.

10. The method of claim 9, wherein causing to switch the broadband signals from the first communication path to the second communication path for the duration, comprises causing to send one or more direct current (DC) pulses to a coaxial switch that switches between the first communication path and the second communication path for the duration.

11. The method of claim 9, wherein the first input includes a magnitude of 12 volts DC.

12. The method of claim 9, wherein the broadband signals comprise one or more Multimedia over Coax Alliance (MoCA) signals, downstream signals or upstream signals.

13. The method of claim 9, wherein the first device comprises a controller, and wherein the controller comprises a programmable power supply.

14. The method of claim 9, wherein the first device comprises a low-pass filter configured to block all of the broadband signals over the second communication path or a band-stop filter configured to block a subset of the broadband signals over the second communication path.

15. A device, comprising:

at least one memory that stores computer-executable instructions;

at least one processor configured to access the at least one memory and execute the computer-executable instructions to:

receive a first input comprising a first periodic voltage control pulse with a duration between 50 milliseconds and 500 milliseconds from a programmable power supply to switch broadband signals from a first communication path between a coaxial cable network and a second device to a second communication path, wherein the second communication path blocks the broadband signals from being received at the second device;

cause, in response to the first input, to switch the broadband signals from the first communication path to the second communication path for the duration; and cause to switch the broadband signals from the second communication path to the first communication path after the duration has expired.

16. The device of claim 15, wherein the computer-executable instructions to cause to switch the broadband signals from the first communication path to the second communication path comprises computer-executable instructions to cause to send one or more direct current (DC) pulses to a coaxial switch that switches between the first communication path and the second communication path for the duration.

17. The device of claim 15, wherein the broadband signals comprise one or more Multimedia over Coax Alliance (MoCA) signals or one or more service provider network signals.

18. The device of claim 15, wherein the device comprises a low-pass filter configured to block all of the broadband signals over the second communication path or a band-stop filter to block a subset of the broadband signals over the second communication path.

* * * * *